United States Patent
Choi et al.

(10) Patent No.: US 9,809,707 B2
(45) Date of Patent: Nov. 7, 2017

(54) POLYMER RESIN COMPOSITION, POLYMER COMPOSITE TAPE, AND FRONT BUMPER OF AUTOMOBILE

(71) Applicants: Hyundai Motor Company, Seoul (KR); Lotte Chemical Corporation, Seoul (KR)

(72) Inventors: Chi Hoon Choi, Suwon, Gyeonggi-do (KR); Jeong Min Cho, Suwon, Gyeonggi-do (KR); Joong Hyun Shin, Hwaseong, Gyeonggi-do (KR); Jiae Yong, Gangneung, Gangwon-do (KR); Jung Tae Kim, Daejeon (KR); Mi Ok Jang, Daejeon (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 127 days.

(21) Appl. No.: 14/963,342

(22) Filed: Dec. 9, 2015

(65) Prior Publication Data

US 2016/0347948 A1    Dec. 1, 2016

(30) Foreign Application Priority Data

May 29, 2015    (KR) .................. 10-2015-0076175

(51) Int. Cl.
| | |
|---|---|
| *C08L 51/00* | (2006.01) |
| *C08L 51/08* | (2006.01) |
| *C08L 23/12* | (2006.01) |
| *B60R 19/03* | (2006.01) |

(52) U.S. Cl.
CPC .............. *C08L 51/08* (2013.01); *B60R 19/03* (2013.01); *C08L 23/12* (2013.01)

(58) Field of Classification Search
CPC ........... C08L 51/08; C08L 23/12; B60R 19/03
See application file for complete search history.

(56) References Cited

U.S. PATENT DOCUMENTS

| | | | |
|---|---|---|---|
| 5,721,315 A | 2/1998 | Evans et al. | |
| 6,270,815 B1 | 8/2001 | Kim et al. | |
| 7,044,516 B2 | 5/2006 | Kobayashi et al. | |
| 7,160,949 B2 * | 1/2007 | Ota | B32B 27/32 525/242 |
| 7,959,197 B2 | 6/2011 | Agrahari et al. | |
| 9,518,188 B2 * | 12/2016 | Lettow | H01B 1/24 |
| 2003/0184099 A1 * | 10/2003 | Van Damme | B29C 70/46 293/120 |

(Continued)

FOREIGN PATENT DOCUMENTS

| | | |
|---|---|---|
| JP | 2005/25581 A | 5/2005 |
| JP | 2006-500252 A | 1/2006 |

(Continued)

*Primary Examiner* — Joseph D Pape
(74) *Attorney, Agent, or Firm* — Mintz Levin Cohn Ferris Glovsky and Popeo, P.C.; Peter F. Corless

(57) ABSTRACT

Disclosed are a polymer resin composition comprising: a binder resin including an olefin-based polymer resin; a carbon fiber surface-treated with a predetermined compound; and a modified polyolefin resin grafted with polyetheramine-bonded dicarboxylic acid or an acid anhydride thereof, a polymer composite tape including the polymer resin composition, and a front bumper of a vehicle equipped with the polymer composite tape.

18 Claims, 3 Drawing Sheets

Previously Known beam-front bumper    Beam-front bumper having polymer composite tape of exemplary embodiment applied thereto Polymer composite tape Polypropylene-molded polymer composite tape

(56) References Cited

U.S. PATENT DOCUMENTS

| | | | |
|---|---|---|---|
| 2004/0210289 A1* | 10/2004 | Wang | A61K 9/5094 607/116 |
| 2014/0230634 A1 | 8/2014 | Nakai | |
| 2016/0280828 A1* | 9/2016 | Kawabe | C08F 210/06 |

FOREIGN PATENT DOCUMENTS

| KR | 1999-028782 A | 4/1999 |
|---|---|---|
| KR | 2001-0012536 A | 2/2001 |
| KR | 10-2008-0061077 A | 7/2008 |

* cited by examiner

POLYMER RESIN COMPOSITION, POLYMER COMPOSITE TAPE, AND FRONT BUMPER OF AUTOMOBILE

CROSS-REFERENCE TO RELATED APPLICATION

This application claims the benefit of priority Korean Patent Application No. 10-2015-0076175 filed on May 29, 2015 with the Korean Intellectual Property Office, the entire contents of which are incorporated herein by reference.

TECHNICAL FIELD

The present invention relates to a polymer resin composition, a polymer composite tape including the polymer resin composition, and a front bumper of a vehicle using the polymer resin composition.

BACKGROUND

A polypropylene resin has characteristics such as excellent moldability, mechanical physical properties and chemical resistance, thereby being used in various fields such as vehicle interior parts, household appliance parts, industrial materials, textiles or films. However, since the polypropylene resin has relatively low tensile strength and flexural strength, the use thereof in the fields requiring toughness and stiffness such as automotive parts has been limited.

Thus, in order to improve the tensile strength, flexural strength, and impact strength of a polypropylene resin, methods of adding rigid reinforcements such as other polymer resins and rubber components are used, but the general reinforcing materials may have a limitation such that it may not sufficiently improve the mechanical physical properties of the resin.

Further, recently, a glass fiber has been widely used as rigid reinforcements, in order to apply a polypropylene resin to vehicle parts and electric/electronic parts. Since the glass fiber may allow a physical property improvement effect to be obtained with less amount than that of previously used talc, whisker or the like, it has been applied to various fields. However, the polypropylene resin with a glass fiber added may have a problem such that the glass fiber may be broken and scattered, thereby reducing mechanical physical properties.

Recently, various attempts have been made to use not only a glass fiber, but also various microfiber as rigid reinforcements, however, development of a method of reducing scattering of a polypropylene resin and rigid reinforcements, and maintaining or improving mechanical physical properties such as flexural elastic modulus and impact strength to or above a certain level is currently needed.

Although a method of using a carbon fiber as rigid reinforcements has been recently developed, reactivity between a carbon fiber having a reactive functional group on the surface and nonpolar polypropylene may not be substantial, and thus, there also may be a limitation in that the strength of a carbon fiber is hardly reflected on a polypropylene composite. Further, various other additives have been used in order to increase reactivity or compatibility between a carbon fiber and polypropylene, however, the physical property value thereof may be currently of about 50% of a theoretically obtainable value.

The above information disclosed in this Background section is only for enhancement of understanding of the background of the invention and therefore it may contain information that does not form the prior art that is already known in this country to a person of ordinary skill in the art.

SUMMARY OF INVENTION

In preferred aspects, the present invention provides a polymer resin composition having advantages of reducing scattering of an olefin-based polymer resin and a carbon fiber, and providing improved mechanical physical properties such as flexural elastic modulus, tensile strength and impact strength of a fiber composite.

Further, the present invention provides a polymer composite tape having advantages of being applied to a front bumper of a vehicle to reduce the total weight and to improve high-speed crash performance robustness.

Moreover, the present invention provides a vehicle part, such as weight-reduced front bumper of the vehicle, having an advantages of having improved high-speed crash performance robustness.

In one aspect, provided is a polymer resin composition that may comprise: a binder resin comprising an olefin-based polymer resin; a carbon fiber that is surface-treated with one or more compounds selected from the group consisting of an epoxy compound, a phenol compound, polyester and vinyl ester; and a modified polyolefin resin that is grafted with polyetheramine-bonded dicarboxylic acid or an acid anhydride thereof.

In particular, the modified polyolefin resin may be grafted with an amount of about 0.1 to 10 wt %, or particularly with an amount of about 2 to 6 wt %, of the polyetheramine-bonded dicarboxylic acid or the acid anhydride thereof, based on the total weight of the modified polyolefin resin. Further, the modified polyolefin resin may include polypropylene resin having a molecular weight distribution of about 5 to 10 and an isotactic index of about 97% to 100%.

The polyetheramine includes one or more polyetheramines selected from the group consisting of following Chemical Formulae 1 to 3:

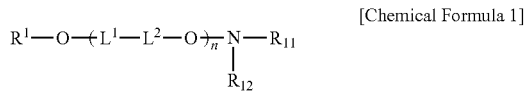

[Chemical Formula 1]

wherein in Chemical Formula 1, $L^1$ and $L^2$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^1$ is hydrogen, an alkyl group having 1 to 18 carbon atoms, or an aryl group having 6 to 30 carbon atoms unsubstituted or substituted with an alkyl group having 1 to 18 carbon atoms;

n is an integer of 1 to 500; and $R_{11}$ and $R_{12}$ are each independently hydrogen or an alkyl group having 1 to 10 carbon atoms;

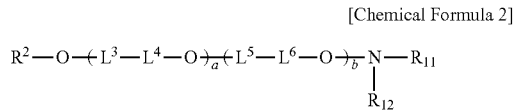

[Chemical Formula 2]

wherein in Chemical formula 2, $L^3$, $L^4$, $L^5$ and $L^6$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^2$ is hydrogen, an alkyl group having 1 to 18 carbon atoms, or an aryl group having 6 to 30 carbon atoms unsubstituted or substituted with an alkyl group having 1 to 18 carbon atoms;

$R_{11}$ and $R_{12}$ are each independently hydrogen or an alkyl group having 1 to 10 carbon atoms; and a and b are same or different and are each independently an integer of 1 to 500;

[Chemical Formula 3]

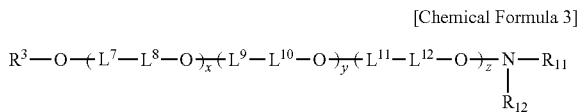

wherein in Chemical Formula 3, $L^7$, $L^8$, $L^9$, $L^{10}$, $L^{11}$ and $L^{12}$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^3$ is hydrogen, an alkyl group having 1 to 18 carbon atoms, or an aryl group having 6 to 30 carbon atoms unsubstituted or substituted with an alkyl group having 1 to 18 carbon atoms;

$R_{11}$ and $R_{12}$ are each independently hydrogen or an alkyl group having 1 to 10 carbon atoms; and y is an integer of 2 to 500, x and z are each integer and (x+z) is an integer of 2 to 100.

The modified polyolefin resin grafted with polyetheramine-bonded dicarboxylic acid or an acid anhydride thereof may have a weight average molecular weight of about 5,000 to 500,000.

The olefin-based polymer resin may include a polypropylene resin. In particular, the binder resin may include a crystalline polypropylene resin having a melting index of about 30 g/10 min to 100 g/10 min according to ASTM D1238 at a temperature of about 230° C. Further, the crystalline polypropylene resin may have a molecular weight distribution of about 5 to 10, and isotactic index of about 97% to 100%.

The "isotactic index", as used herein, refers to a percentage of particular polymer, such as polypropylene, which may be insoluble in certain boiling solvent, such as hexane.

The carbon fiber surface-treated with one or more compounds selected from the group consisting of an epoxy compound, a phenol compound, polyester and vinyl ester may have a density of about 1.70 g/cm³ to 1.90 g/cm³ and a weight per unit length of about 200 g/1000 m to 4,000 g/1000 m.

The binder resin including the olefin-based polymer resin may be included in the polymer resin composition in an amount of about 20 to 95 wt %; the carbon fiber that is surface-treated with one or more compounds selected from the group consisting of an epoxy compound, a phenol compound, polyester and vinyl ester may be included in the polymer resin composition in an amount of about 1 to 70 wt %; and the modified polyolefin resin that is grafted with polyetheramine-bonded dicarboxylic acid or an acid anhydride thereof may be included in the polymer resin composition in an amount of about 0.1 to 20 wt %, all the wt % based on the total weight of the polymer composite resin.

In another aspect, further provided is a polymer composite tape comprising the polymer resin composition as described above.

Still further provided is a vehicle part that comprising the polymer composite tape. For example, the vehicle part may be a front bumper of a vehicle. In the front bumper of a vehicle, the polymer composite tape may be wrapped around two or more beam-front bumpers. Further, the front bumper of a vehicle may further include: an olefin-based polymer resin layer formed on the polymer composite tape.

Other aspects of the invention are disclosed infra.

DETAILED DESCRIPTION

Figure 1:
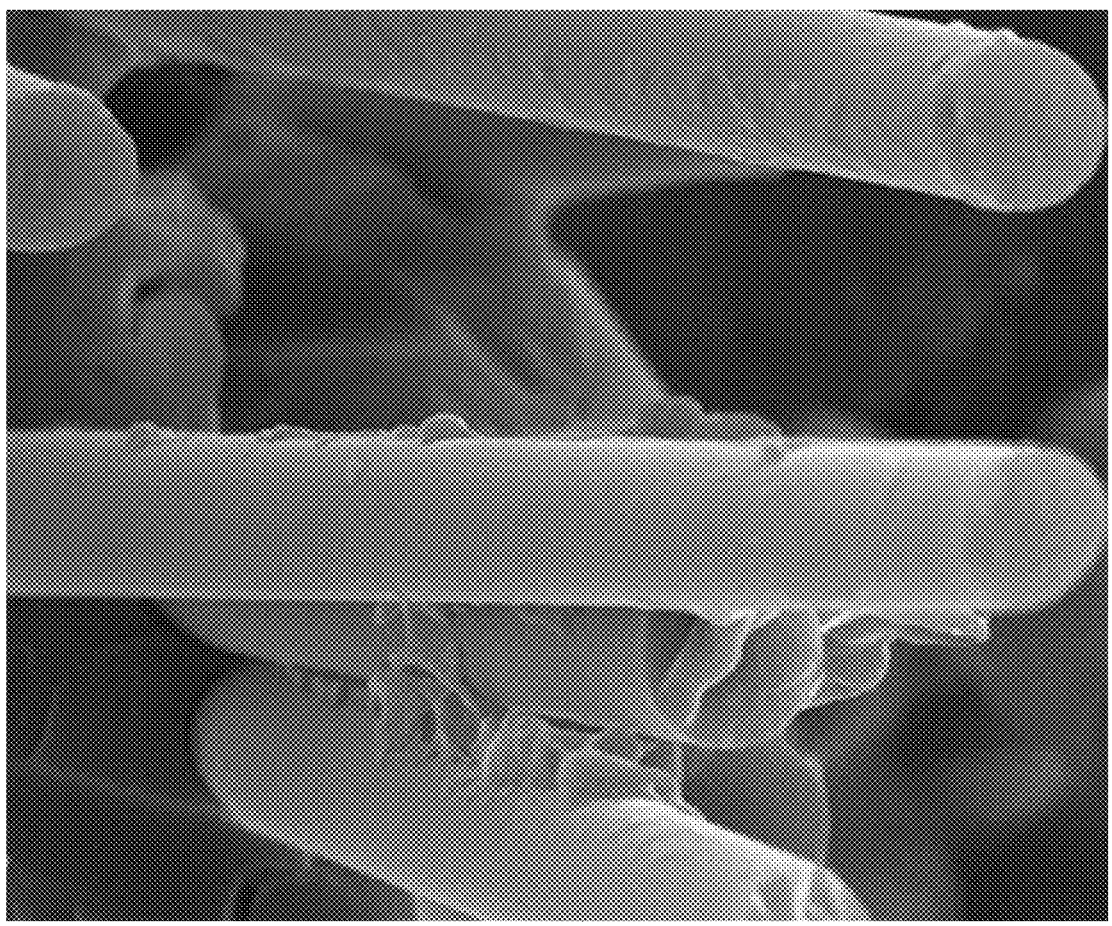
FIG. 1 shows a microscopic view of a fracture plane of an exemplary polymer resin composition of Example 1 according to an exemplary embodiment of the present invention, which is obtained from a scanning electron microscope (SEM).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, the present invention provides a polymer resin composition.

In an exemplary embodiment of the present invention, provided is a polymer resin composition that may include: a binder resin including an olefin-based polymer resin; a carbon fiber surface-treated with one or more compounds selected from the group consisting of an epoxy compound, a phenol compound, polyester and vinyl ester; and a modified polyolefin resin grafted with polyetheramine-bonded dicarboxylic acid or an acid anhydride thereof.

In another aspect, the present invention provides a polymer composite tape including the polymer resin composition.

Further, in another aspect, the present invention provides a vehicle part that may be equipped with the polymer composite tape. Exemplary vehicle part according to an exemplary embodiment of the present invention may be a front bumper of the vehicle.

Hereinafter, a polymer resin composition, a polymer composite tape, and a front bumper of a vehicle according to various exemplary embodiments of the present invention will be described in detail.

According to an exemplary embodiment of the present invention, a polymer resin composition may include: a binder resin including an olefin-based polymer resin; a carbon fiber surface-treated with one or more compounds selected from the group consisting of an epoxy compound, a phenol compound, polyester and vinyl ester; and a modified polyolefin resin grafted with polyetheramine-bonded dicarboxylic acid or an acid anhydride thereof.

The inventors of the present invention have conducted a research on a method of impregnating a carbon fiber in a binder resin including an olefin-based polymer resin. As a result, it has been confirmed, through experiments, that mixing the carbon fiber bound to a surface of the predetermined compound as described above and the binder fiber together with a modified polyolefin resin grafted with polyetheramine-bonded dicarboxylic acid or an acid anhydride thereof may provide polymer resin composite materials having greatly improved reactivity and compatibility between the binder resin and the carbon fiber, reduced scattering of the olefin-based polymer resin and the carbon fiber, and higher mechanical physical properties such as flexural elastic modulus, tensile strength and impact strength.

The polymer resin composition may include the modified polyolefin resin grafted with polyetheramine-bonded dicarboxylic acid or an acid anhydride thereof, as such interfacial adhesion between a carbon fiber and a binder resin may be increased, and impregnation of a carbon fiber may be maximized, thereby providing a polymer resin composition having excellent tensile strength.

In the related arts, a method of adding a known modified polyolefin resin grafted with a maleic anhydride to an olefin-based polymer resin to increase compatibility with rigid reinforcements such as a glass fiber has been previously known. However, such method may be difficult to sufficiently improve compatibility between a carbon fiber and an olefin-based polymer resin, or an impregnation property of a carbon fiber in an olefin-based polymer resin, only with the polypropylene resin grafted with a maleic anhydride. Additionally, there may be a certain limitation in improvement of a flexural elastic modulus, tensile strength and impact resistance of a finally prepared polymer resin composition or polymer composite.

The 'modified polyolefin resin grated with polyetheramine-bonded dicarboxylic acid or an acid anhydride thereof', as used herein, refers to a polyolefin-based polymer wherein polyetheramine-bonded dicarboxylic acid or an acid anhydride thereof is grafted on a polyolefin main chain to form a branched chain.

The dicarboxylic acid may include maleic acid, phthalic acid, itaconic acid, citraconic acid, alkenyl succinic acid, cis-1,2,3,6-tetrahydrophthalic acid, 4-methyl-1,2,3,6-tetrahydrophthalic acid or a mixture of two or more thereof, and the dianhydride of the dicarboxylic acid may be dicarboxylic dianhydride of the above described example.

The modified polyolefin resin may be grafted with an amount of about 0.1 to 10 wt %, or an amount of about 2 to 6 wt % of polyetheramine-bonded dicarboxylic acid or an acid anhydride thereof.

The polyetheramine-bonded dicarboxylic acid or the acid anhydride thereof has a content of about 0.1 wt % to 10 wt % in the modified polyolefin resin, based on the total weight of the modified polyole. When less than about 0.1 wt % of the polyetheramine-bonded dicarboxylic acid or the acid anhydride thereof is grafted on the polyolefin resin, it may be difficult to sufficiently exhibit performance increasing compatibility or reactivity, and when greater than about 10 wt % of the polyetheramine-bonded dicarboxylic acid or the acid anhydride thereof is grafted on the polyolefin resin, the mechanical physical properties or flexibility of the polymer resin composition or a resin molded article formed therefrom may be reduced.

The grafting ratio of the polyetheramine-bonded dicarboxylic acid or the acid anhydride thereof may be measured from the result obtained by acid-base titration of the modified polyolefin resin. For example, about 1 g of the modified polypropylene resin is added to 150 ml of water-saturated xylene, which is refluxed for 2 hour, and then a small amount of a 1 wt % thymol blue-dimethyl formamide solution is added thereto, slightly excess titration is carried out with a 0.05 N sodium hydroxide-ethyl alcohol solution to obtain a navy blue solution, thereafter, back titration of the solution is carried out with a 0.05 N hydrochloric acid-isopropyl alcohol solution until the solution represents yellow, thereby determining the acid value, and thus, the amount of the polyetheramine-bonded dicarboxylic acid or the acid anhydride thereof grafted on the modified polypropylene resin may be calculated therefrom.

As the modified polyolefin resin, any olefin-based polymer known as being commonly used in a resin molded article may be used without any particular limitation, and for example, the modified polyolefin resin may include a polypropylene resin having a molecular weight distribution of about 5 to 10, and a polypropylene resin having an isotactic index of about 97% to 100%.

Further, the modified olefin resin may be a polypropylene resin having a molecular weight distribution of about 5 to 10, and an isotactic index of about 97% to 100%.

As polyetheramine is present at the end of the modified olefin resin, the carbon fiber may have adhesion and compatibility greater than a polymer resin such as polypropylene, and the fiber composite impregnated with the surface-modified carbon fiber may have greater mechanical physical properties such as a flexural elastic modulus and impact strength.

The polyetheramine may include one or more polyetheramines selected from the group consisting of following Chemical Formulae 1 to 3:

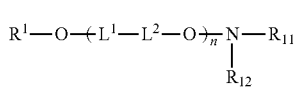
[Chemical Formula 1]

wherein in Chemical Formula 1, $L^1$ and $L^2$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^1$ is hydrogen, an alkyl group having 1 to 18 carbon atoms, or an aryl group having 6 to 30 carbon atoms unsubstituted or substituted with an alkyl group having 1 to 18 carbon atoms;

n is an integer of 1 to 500; and $R_{11}$ and $R_{12}$ are each independently hydrogen or an alkyl group having 1 to 10 carbon atoms;

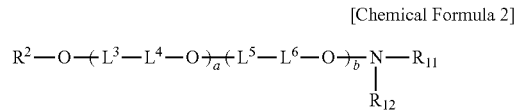
[Chemical Formula 2]

wherein in Chemical Formula 2, $L^3$, $L^4$, $L^5$, and $L^6$ are each independently other alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^2$ is hydrogen, an alkyl group having 1 to 18 carbon atoms, or an aryl group having 6 to 30 carbon atoms unsubstituted or substituted with an alkyl group having 1 to 18 carbon atoms;

$R_{11}$ and $R_{12}$ are hydrogen or an alkyl group having 1 to 10 carbon atoms, respectively; and a and b are same or different and are independently of each other an integer of 1 to 500;

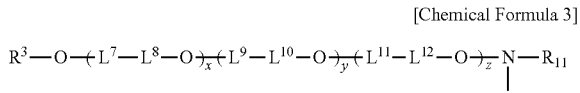
[Chemical Formula 3]

wherein in Chemical Formula 3, $L^7$, $L^8$, $L^9$, $L^{10}$, $L^{11}$ and to $L^{12}$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;

$R^3$ is hydrogen, an alkyl group having 1 to 18 carbon atoms, or an aryl group having 6 to 30 carbon atoms unsubstituted or substituted with an alkyl group having 1 to 18 carbon atoms;

$R_{11}$ and $R_{12}$ are each independently hydrogen or an alkyl group having 1 to 10 carbon atoms; and y is an integer of 2 to 500, x and z are each integer and (x+z) is an integer of 2 to 100.

The modified polyolefin resin grafted with polyetheramine-bonded dicarboxylic acid or an acid anhydride thereof may have a weight average molecular weight of about 5,000 to 500,000.

The polymer resin composition of the embodiment may include an amount of about 0.1 to 20 wt %, or an amount of about 0.5 to 10 wt % of the modified polyolefin resin grafted with polyetheramine-bonded dicarboxylic acid or an acid anhydride thereof.

Meanwhile, as the binder resin, an olefin-based polymer resin may be used, and in particular, the olefin-based polymer resin may include a polypropylene resin.

As the polypropylene resin, any polypropylene polymer known as being commonly used in a resin molded article may be used without any particular limitation. In particular, a highly crystalline or a crystalline polypropylene resin having a melting index of about 30 to 100 g/10 min (ASTM D1238, 230° C.) may be used.

When the polypropylene resin has a melting index less than about 30 g/10 min (ASTM D1238, 230° C.), it may be difficult to secure sufficient processability during a molding process, and due to high viscosity, dispersion of a carbon fiber may be interrupted. Further, when the polypropylene resin has a melting index greater than about 100 g/10 min (ASTM D1238, 230° C.), it may be difficult for a final product to have appropriate impact strength, due to low viscosity, and as a result, additionally, tensile strength, flexural strength, and an elastic modulus may be lowered.

The polymer resin composition may include an amount of about 20 to 95 wt %, or an amount of about 40 to 80 wt % of the polypropylene resin, based on the total weight of the polymer resin composition. When the content of the polypropylene resin is less than the predetermined amount, for example, less than about 20 wt %, the flowability of the resin composition may be reduced, thereby generating a problem in moldability, and the amount of the filler or additive such as the carbon fiber may be too large, thereby unduly increasing the specific gravity of a final product, or reducing processability. When the content of the polypropylene resin is greater than the predetermined amount, for example, greater than about 95 wt %, agglomeration due to the low dispersion density of a carbon fiber may be generated, and the content of the carbon fiber may not be sufficient, thereby lowering the mechanical physical properties of a final product.

The highly crystalline polypropylene resin may have a molecular weight distribution of about 5 to 10, and an isotactic index of about 97% to 100%.

As described above, the polymer resin composition of the embodiment may include a carbon fiber surface-treated with one or more compounds selected from the group consisting of an epoxy compound, a phenol compound, polyester and vinyl ester.

Particularly, the polymer resin composition of the embodiment may include an amount of about 1 to 70 wt %, or an amount of about 10 to 55 wt %, based on the total weight of the polymer resin composition, of the carbon fiber surface-treated with one or more compounds selected from the group consisting of an epoxy compound, a phenol compound, polyester and vinyl ester.

When the content of the carbon fiber is included less than the predetermined amount, for example, less than about 1 wt % of the polymer resin composition, the mechanical physical properties of a final product may be lowered, and when the content of the carbon fiber is included greater than about 70 wt % of the polymer resin composition, the specific gravity of a final product may be too high, or processability may be reduced.

The carbon fiber surface-treated with one or more compounds selected from the group consisting of an epoxy compound, a phenol compound, polyester and vinyl ester may have density of about 1.70 g/cm$^3$ to 1.90 g/cm$^3$. Further, the carbon fiber surface-treated with one or more compounds selected from the group consisting of an epoxy compound, a phenol compound, polyester and vinyl ester may have a weight per unit length of about 200 g/1000 m to 4,000 g/1000 m.

In the process of impregnation of the carbon fiber surface-treated with a compound in the binder resin, any method and device known as impregnating a glass long-fiber in a thermoplastic resin may be used without any particular limitation.

According to another aspect of the invention, a polymer composite tape including a polymer resin composition may be provided.

The polymer composite tape may be provided by various preparation methods using the polymer resin composition of the above described embodiment, and for example, may be prepared in a tape or strand shape by passing fiber through an impregnation die supplied by polymer resin melt, and then pulling and compressing the resultant.

The polymer composite tape may reduce scattering of an olefin-based polymer resin and a carbon fiber, improve mechanical physical properties such as a flexural elastic modulus, tensile strength and impact strength of a fiber composite. As such, the polymer composite tape may be applied to a vehicle part, such as a front bumper of the vehicle, to reduce the total weight, and improve high-speed crash performance robustness.

Further, the present invention provides a vehicle part, particularly comprising the polymer composite tape including the polymer composite resin as described above. In particular, a front bumper of an vehicle may be equipped with polymer composite tape.

Figure 3:
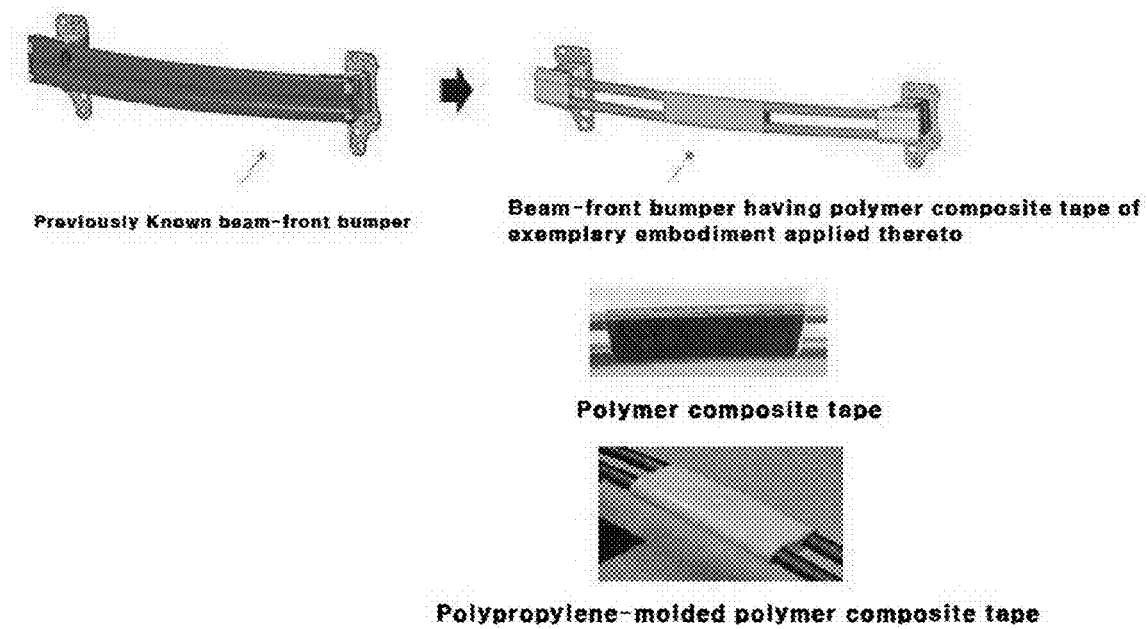
FIG. 3 shows an exemplary polymer composite tape of the Example, a front bumper of a vehicle in which the polymer composite tape may be installed, and the conventional front bumper made of steel.

As illustrated in FIG. 3, in case of a front back beam of an automobile, it is common up to now to apply steel thereto, due to a safety problem upon crash. However, the front bumper of the vehicle may have a steel/plastic composite hybrid structure considering a safety problem for automobile weight reduction, thereby reducing weight of the vehicle, as well as securing safety upon a high-speed crash.

In the front bumper of the vehicle, the polymer composite tape may be wrapped around two or more beam-front bumpers. For example, the polymer composite tape may be wrapped around two or more hot-molded pipes installed parallel to each other to manufacture a front bumper.

In addition, an olefin-based polymer resin layer formed on the polymer composite tape may be further included. Particularly, after wrapping the polymer composite tape around the bumper beam installed on the front bumper, the outside of the polymer composite tape may be molded with an olefin-based polymer resin to form an olefin-based polymer resin layer.

According to the present invention, provided is a polymer resin composition may be capable of reducing scattering of an olefin-based polymer resin and a carbon fiber, and improving mechanical physical properties such as a flexural elastic modulus, tensile strength and impact strength of a fiber composite. Further provided is a polymer composite tape that may be applied to a vehicle part, such as a front bumper of the vehicle, to reduce the total weight and improve high-speed crash performance robustness. Still further provided is a weight-reduced front bumper of a vehicle which may have improved high-speed crash performance robustness.

EXAMPLE

The present invention will be described in detail in the following Examples. However, the following Examples are only illustrative of the present invention, and do not limit the disclosure of the present invention in any way.

Comparative Examples and Examples: Preparation of Polymer Resin Composition

Comparative Example 1

Figure 2:
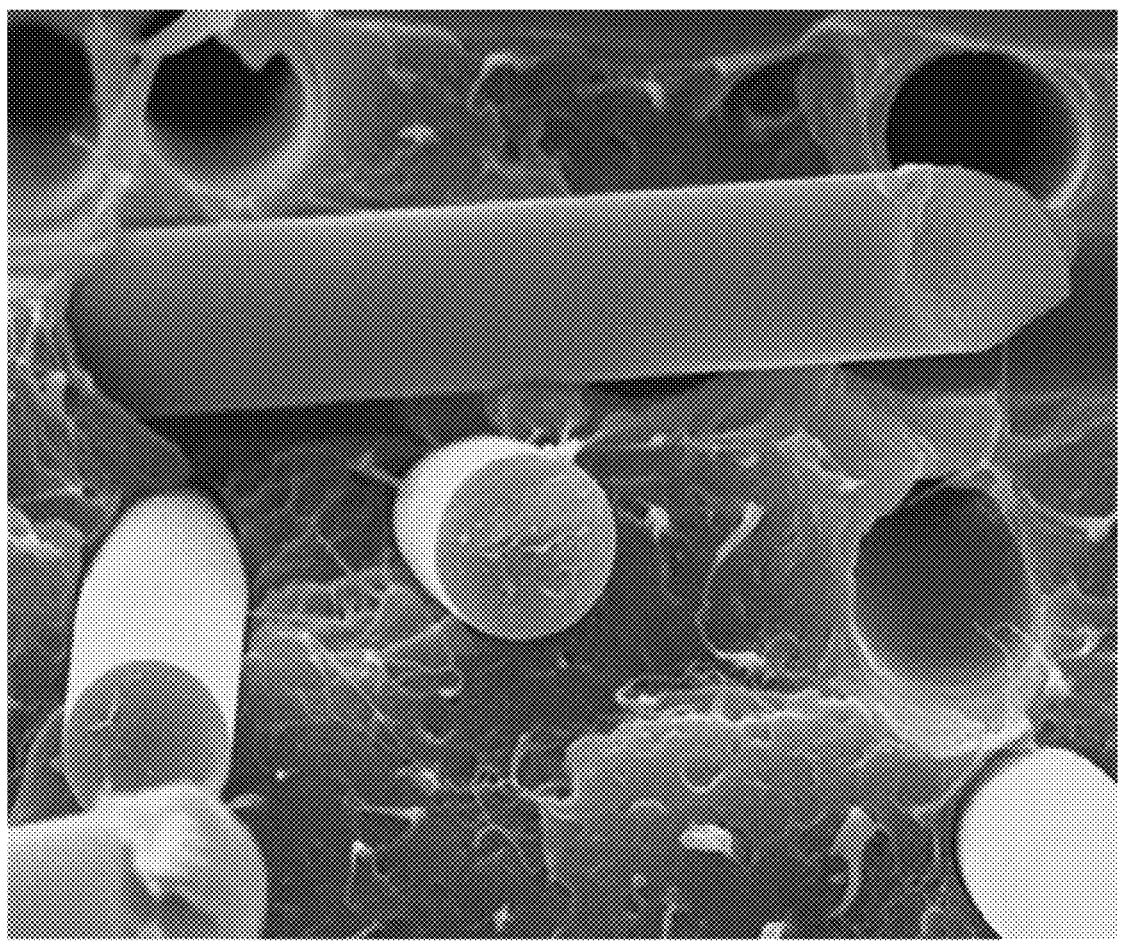
FIG. 2 shows a microscopic view of a fracture plane of a polymer resin composition of Comparative Example 1, which is obtained from a scanning electron microscope (SEM).

A highly crystalline polypropylene resin (melting index: 60 g/10 min (ASTM D1238, 230° C.), molecular weight distribution: 7, isotactic index 98.8%) was kneaded at 240° C. and 300 rpm with a twin-screw extruder without a compatibilizer, and impregnated with an epoxy-sized carbon fiber from Toray Industries, Inc., (CF, Grade name, T700SC-24000-50C) at a die temperature of 270° C. at a weight ratio of 6:4 to obtain a carbon fiber-reinforced polymer resin composition. The SEM photograph of a fracture plane of the obtained polymer resin composition is shown in FIG. 2.

Comparative Example 2

A highly crystalline polypropylene resin (melting index: 60 g/10 min (ASTM D1238, 230° C.), molecular weight distribution: 7, isotactic index 98.8%) was kneaded at a temperature of 240° C. and 300 rpm with a twin-screw extruder with polypropylene (molecular weight distribution: 7, isotactic index 98.8%) having a maleic anhydride graft ratio of 1 wt %. The resultant kneaded product was impregnated with an epoxy-sized carbon fiber from Toray Industries, Inc., (CF, Grade name T700SC-24000-50C) at a die temperature of 270° C. to obtain a carbon fiber-reinforced polymer resin composition.

Comparative Example 3

As shown in Table 1 below, a carbon fiber-reinforced polymer resin composition was obtained in the same manner as in Comparative Example 2, except that the content of the polypropylene having a maleic anhydride graft ratio of 1 wt % was different.

Comparative Example 4

A carbon fiber-reinforced polymer resin composition was obtained in the same manner as in Comparative Example 2, except that polypropylene having a maleic anhydride graft ratio of 4 wt % was used instead of the polypropylene having a maleic anhydride graft ratio of 1 wt %.

Comparative Example 5

A carbon fiber-reinforced polymer resin composition was obtained in the same manner as in Comparative Example 3, except that polypropylene having a maleic anhydride graft ratio of 4 wt % was used instead of the polypropylene having a maleic anhydride graft ratio of 1 wt %.

Example 1

A highly crystalline polypropylene resin (melting index: 60 g/10 min (ASTM D1238, 230° C.), molecular weight distribution: 7, isotactic index 98.8%) was kneaded at a temperature of 240° C. and 300 rpm with a twin-screw extruder with GMP730X prepared by reaction of polypropylene (molecular weight distribution: 7, isotactic index 98.8%) having a maleic anhydride graft ratio of 4 wt % with PEA (polyethylamine).

The resultant kneaded product was impregnated with an epoxy-sized carbon fiber from Toray Industries, Inc., (CF, Grade name T700SC-24000-50C) at a die temperature of 270° C. to obtain a carbon fiber-reinforced polymer resin composition.

The SEM photograph of a fracture plane of the obtained polymer resin composition is shown in FIG. 1.

Example 2

A carbon fiber-reinforced polymer resin composition was obtained in the same manner as in Example 1, except that the content of GMP730X is different, as shown in the following Table 1.

Example 3

A carbon fiber-reinforced polymer resin composition was obtained in the same manner as in Example 1, except that the content of GMP730X was different, as shown in the following Table 1.

Preparation Example and Experimental Example: Manufacture of Polymer Composite Tape and Front Bumper of Automobile, and Physical Property Evaluation Thereof

Preparation Example 1—Preparation of Polymer Composite Tape

Polymer composite tape (width: 5-12 mm, thickness: 0.4-0.5 mm) was manufactured under a condition where each polymer resin composition obtained in the Examples and Comparative Examples was pulled and compressed to form a tape or strand shape.

Preparation Example 2—Manufacture of Front Bumper of Automobile

As shown in FIG. 3, the above manufactured polymer composite tape was wrapped around two hot-molded pipes installed parallel to each other to manufacture a front bumper.

Experimental Example 1: Tensile Strength (TS) Measurement

Test speed of 50 m/min was applied with a universal testing machine at a temperature of 23° C. under a relative humidity of 50% according to ASTM D638, to measure tensile strength at break of the above manufactured polymer composite tape.

Experimental Example 2: Flexural Strength (FS) Measurement

Test speed of 10 m/min was applied with a universal testing machine at a temperature of 23° C. under a relative humidity of 50% according to ASTM D790, to measure flexural strength of the above manufactured polymer composite tape.

Experimental Example 3: Flexural Elastic Modulus (FM) Measurement

Test speed of 10 m/min was applied with a universal testing machine at 23° C. under a relative humidity of 50% according to ASTM D790, to measure flexural elastic modulus of the above manufactured polymer composite tape.

TABLE 1

| Classification | Polymer resin composition [wt %] | | | | | Tensile strength (MPa) | Flexural strength (MPa) | Flexural elastic modulus (GPa) |
| --- | --- | --- | --- | --- | --- | --- | --- | --- |
| | PP | CF | Compatibilizer 1 | Compatibilizer 2 | Compatibilizer 3 | | | |
| Comparative Example 1 | 60 | 40 | — | — | — | 250 | 120 | 14 |
| Comparative Example 2 | 59 | 40 | 1 | — | — | 580 | 535 | 24 |
| Comparative Example 3 | 57 | 40 | 3 | — | — | 540 | 521 | 23 |
| Comparative Example 4 | 59 | 40 | — | 1 | — | 610 | 563 | 24 |
| Comparative Example 5 | 57 | 40 | — | 3 | — | 600 | 568 | 24 |
| Example 1 | 59 | 40 | — | — | 1 | 950 | 870 | 24 |
| Example 2 | 57 | 40 | — | — | 3 | 840 | 565 | 24 |
| Example 3 | 55 | 40 | — | — | 5 | 760 | 530 | 24 |

As shown in the above Table 1, the polymer composite tape manufactured using each polymer resin composition obtained in Examples 1 to 3 had tensile strength of about 700 MPa or greater, flexural strength of about 500 MPa or greater, and a flexural elastic modulus of about 24 GPa.

On the contrary, it was confirmed that the polymer composite tape manufactured using the polymer resin compositions obtained in Comparative Examples 1 to 5 had only a reduced tensile strength, flexural strength and a flexural elastic modulus (Comparative Example 1), or had only a reduced tensile strength or flexural strength, as compared with the Examples (Comparative Examples 2 to 5).

Further, as compared in FIGS. 1 and 2, it was confirmed in the polymer resin composition of Example 1 that a carbon fiber surface-treated with epoxy and a polypropylene resin were tightly combined (impregnated), whereas it was confirmed in the polymer resin composition of Comparative Example 1 that a carbon fiber surface-treated with epoxy and a polypropylene resin were not tightly combined, or a plurality of spaces where a carbon fiber was impregnated then left were shown.

What we claim:
1. A polymer resin composition comprising:
    a binder resin comprising an olefin-based polymer resin;
    a carbon fiber that is surface-treated with one or more compounds selected from the group consisting of an epoxy compound, a phenol compound, polyester and vinyl ester; and
    a modified polyolefin resin that is grafted with polyetheramine-bonded dicarboxylic acid or an acid anhydride thereof.
2. The polymer resin composition of claim 1, wherein the modified polyolefin resin is grafted with an amount of about 0.1 to 10 wt % of the polyetheramine-bonded dicarboxylic acid or the acid anhydride thereof, based on the total weight of the modified polyolefin resin.
3. The polymer resin composition of claim 2, wherein the modified polyolefin resin is grafted with an amount of about 2 to 6 wt % of the polyetheramine-bonded dicarboxylic acid or the acid anhydride thereof, based on the total weight of the modified polyolefin resin.
4. The polymer resin composition of claim 1, wherein the modified polyolefin resin includes a polypropylene resin having a molecular weight distribution of about 5 to 10.
5. The polymer resin composition of claim 4, wherein the modified polyolefin resin includes the polypropylene resin having an isotactic index of about 97% to 100%.
6. The polymer resin composition of claim 1, wherein the polyetheramine includes one or more polyetheramines selected from the group consisting of following Chemical Formulae 1 to 3:

[Chemical Formula 1]

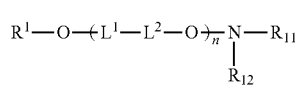

wherein in Chemical Formula 1, $L^1$ and $L^2$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;
$R^1$ is hydrogen, an alkyl group having 1 to 18 carbon atoms, or an aryl group having 6 to 30 carbon atoms unsubstituted or substituted with an alkyl group having 1 to 18 carbon atoms; n is an integer of 1 to 500; and
$R_{11}$ and $R_{12}$ are each independently hydrogen or an alkyl group having 1 to 10 carbon atoms;

[Chemical Formula 2]

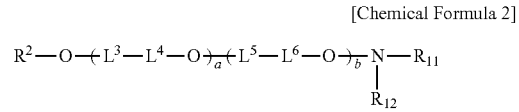

wherein in Chemical formula 2, $L^3$, $L^4$, $L^5$ and $L^6$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;
$R^2$ is hydrogen, an alkyl group having 1 to 18 carbon atoms, or an aryl group having 6 to 30 carbon atoms unsubstituted or substituted with an alkyl group having 1 to 18 carbon atoms;
$R_{11}$ and $R_{12}$ are each independently hydrogen or an alkyl group having 1 to 10 carbon atoms; and
a and b are same or different and are each independently an integer of 1 to 500;

[Chemical Formula 3]

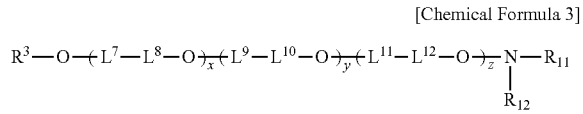

wherein in Chemical Formula 3, $L^7$, $L^8$, $L^9$, $L^{10}$, $L^{11}$ and $L^{12}$ are each independently alkylene having 1 to 10 carbon atoms, alkenylene having 2 to 10 carbon atoms, alkynylene having 2 to 10 carbon atoms, cycloalkylene having 3 to 10 carbon atoms, or arylene having 6 to 30 carbon atoms;
$R^3$ is hydrogen, an alkyl group having 1 to 18 carbon atoms, or an aryl group having 6 to 30 carbon atoms unsubstituted or substituted with an alkyl group having 1 to 18 carbon atoms;
$R_{11}$ and $R_{12}$ are each independently hydrogen or an alkyl group having 1 to 10 carbon atoms; and
y is an integer of 2 to 500, x and z are each integer and (x+z) is an integer of 2 to 100.
7. The polymer resin composition of claim 1, wherein the modified polyolefin resin grafted with polyetheramine-bonded dicarboxylic acid or an acid anhydride thereof has a weight average molecular weight of about 5,000 to 500,000.
8. The polymer resin composition of claim 1, wherein the olefin-based polymer resin includes a polypropylene resin.
9. The polymer resin composition of claim 1, wherein the binder resin includes a crystalline polypropylene resin having a melting index of about 30 g/10 min to 100 g/10 min according to ASTM D1238 at a temperature of about 230° C.
10. The polymer resin composition of claim 9, wherein the crystalline polypropylene resin has a molecular weight distribution of about 5 to 10, and isotactic index of about 97% to 100%.
11. The polymer resin composition of claim 1, wherein the carbon fiber surface-treated with one or more compounds selected from the group consisting of an epoxy compound, a phenol compound, polyester and vinyl ester has density of about 1.70 g/cm³ to 1.90 g/cm³.

12. The polymer resin composition of claim 1, wherein the carbon fiber surface-treated with one or more compounds selected from the group consisting of an epoxy compound, a phenol compound, polyester and vinyl ester has a weight per unit length of about 200 g/1000 m to 4,000 g/1000 m.

13. The polymer resin composition of claim 1, wherein the binder resin including the olefin-based polymer resin is included in the polymer resin composition in an amount of about 20 to 95 wt %; the carbon fiber that is surface-treated with one or more compounds selected from the group consisting of an epoxy compound, a phenol compound, polyester and vinyl ester is included in the polymer resin composition in an amount of about 1 to 70 wt %; and the modified polyolefin resin that is grafted with polyether-amine-bonded dicarboxylic acid or an acid anhydride thereof is included in the polymer resin composition in an amount of about 0.1 to 20 wt %, all the wt % based on the total weight of the polymer composite resin.

14. A polymer composite tape comprising a polymer resin composition of claim 1.

15. A vehicle part that comprising a polymer composite tape of claim 14.

16. The vehicle part of claim 15 is a front bumper of a vehicle.

17. The front bumper of a vehicle of claim 16, wherein the polymer composite tape is wrapped around two or more beam-front bumpers.

18. The front bumper of a vehicle of claim 17, further comprising: an olefin-based polymer resin layer formed on the polymer composite tape.

* * * * *